(12) United States Patent
Stevens et al.

(10) Patent No.: US 7,134,369 B1
(45) Date of Patent: Nov. 14, 2006

(54) PICK-OFF ATTACHMENT FOR A MULTI-SPINDLE MACHINE

(75) Inventors: Scott W. Stevens, Columbia Station, OH (US); Mike Vining, Rocky River, OH (US)

(73) Assignee: Logan Clutch Corporation, Westlake, OH (US)

( * ) Notice: Subject to any disclaimer, the term of this patent is extended or adjusted under 35 U.S.C. 154(b) by 9 days.

(21) Appl. No.: 10/839,735

(22) Filed: May 4, 2004

(51) Int. Cl.
*B23B 13/04* (2006.01)
(52) U.S. Cl. .......................................... 82/124; 82/129
(58) Field of Classification Search ................. 82/124, 82/129, 142, 165; 279/134, 146; *B23B 13/04*
See application file for complete search history.

(56) References Cited

U.S. PATENT DOCUMENTS

| | | | | |
|---|---|---|---|---|
| 2,750,025 A | * | 6/1956 | Nichta | 226/100 |
| 3,176,553 A | * | 4/1965 | Schubert | 82/162 |
| 3,814,299 A | * | 6/1974 | Spercel | 226/162 |
| 4,773,250 A | * | 9/1988 | Miyazaki | 72/405.06 |
| 5,016,334 A | * | 5/1991 | Kovalenko et al. | 29/38 B |
| 5,095,789 A | * | 3/1992 | Mukai et al. | 82/129 |
| 5,157,998 A | * | 10/1992 | Herrbach | 82/152 |
| 5,642,650 A | * | 7/1997 | Roote et al. | 82/126 |

* cited by examiner

*Primary Examiner*—Daniel W. Howell
*Assistant Examiner*—Sara Addisu
(74) *Attorney, Agent, or Firm*—Daniel D. Wasil; Ralph E. Jocke; Walker & Jocke

(57) ABSTRACT

A multi-spindle machine system includes a pick-off attachment. The pick-off attachment enables a more compact and stronger pick-off spindle. The shorter pick-off spindle is able to pick off longer work pieces. High speed bearings and oil lubrication enable the pick-off attachment to perform additional back machining functions. Other features include a dovetail spindle housing support associated with a slip-inducing composite material, an over-tension stop indicator, and an increased pick off position to cam position ratio.

20 Claims, 8 Drawing Sheets

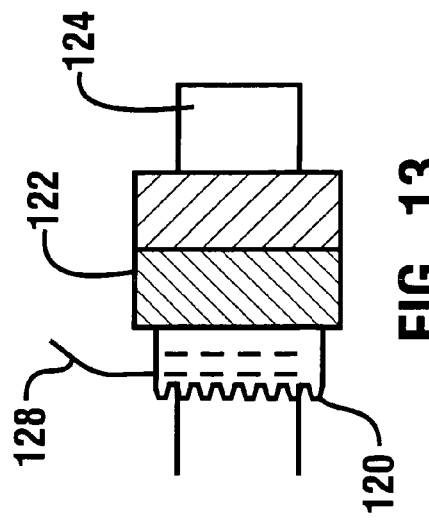
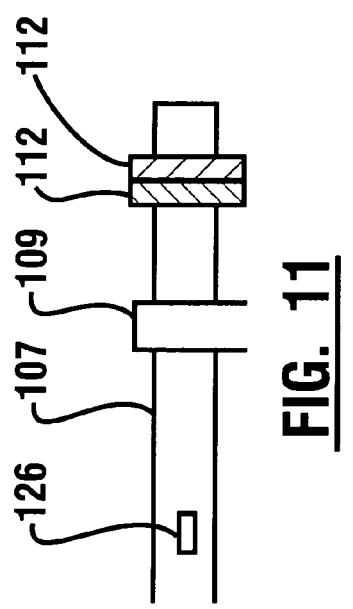
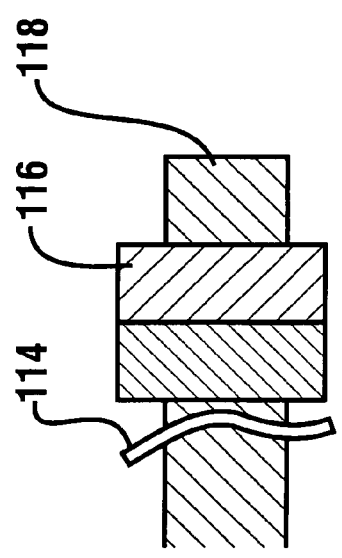
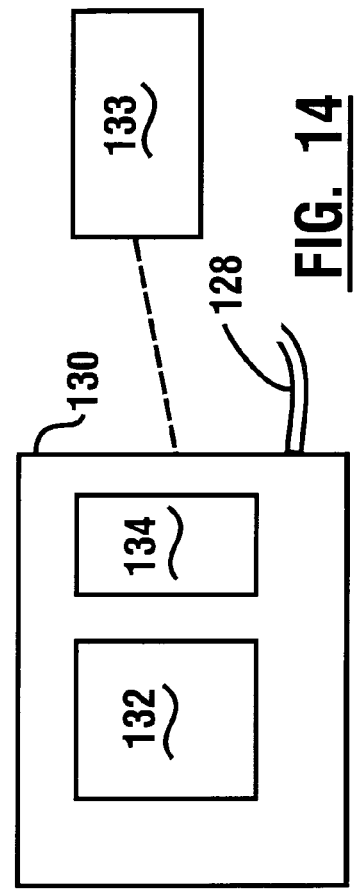

PICK-OFF ATTACHMENT FOR A MULTI-SPINDLE MACHINE

TECHNICAL FIELD

This invention relates in general to multi-spindle machines. Specifically, this invention relates to a multi-spindle machine having a pick-off attachment.

BACKGROUND ART

Multi-spindle machines are known in the prior art. Multi-spindle machines are used to mass produce standardized types of components. A multi-spindle machine typically has several work stations at which machining operations are performed. A piece of raw stock, such as a bar stock, enters the machine at a first station and as the machine indexes, various machining operations are performed. Once the station is indexed completely through the machine, a completed part is formed. The part is released, and the process is repeated for that station with a new piece of raw stock. An advantage of multi-spindle machines is that all stations in the machine can simultaneously contribute to producing parts, resulting in high production.

Multi-spindle machines (also referred to as multiple spindle machines) typically have a large indexing spindle drum with four, five, six or eight work spindles thereon. Each of the spindles carries a work piece. Generally in all but one of the stations, where a new piece of stock enters, a machining operation is performed. After each machining operation is completed, the drum is rotated so that each work piece moves sequentially through the locations where the various machining operations are performed. Machining operations that are typically performed at a multi-spindle machine include turning and threading. Most multi-spindle machines are very efficient in terms of producing standardized parts at a high rate.

Typically, the speed of multi-spindle machines changes from high to low speed and back again during the course of the operating cycle. High speed is normally used for times in the machine cycle when critical machining operations are not occurring. High speed operation is desirable when the drum is indexing, or when the tools are moving toward or away from the work pieces and are not performing work thereon. Low speed operation is generally used when the tools in the machine are cutting or forming the metal. An attempt to operate the machine at a high speed when such cutting or forming work is being performed is likely to cause a problem or jam the machine.

In many multi-spindle machines at the final station the machined work piece is cut off from the remaining stock. The machined work piece is often dropped onto a conveyor or other device to move it away from the machine. It is common to perform additional operations on the machined part before it is ready for use. These additional operations are often done by hand or in other machines and add substantial cost to making the part. In many machines the movement of the work piece after cut off is unpredictable and may result in nicks on the ejected work piece. Therefore, work pieces sometimes become damaged and unusable. Furthermore, because the work piece is released from a rotating collet, large work piece catchers are sometimes required in order to ensure catching and guiding of the falling work pieces. Additionally, the catchers often have to be situated in a crowded tool zone, which often makes it difficult to control the cut off part and avoid damage to parts and other machine components.

In some multi-spindle machines pick-off attachments are available for pick-off of work pieces in the station where the completed work piece is cut off from the remaining stock. The movement of a pick-off attachment is typically set with the timing of the multi-spindle machine. After the work piece is separated from the remaining stock by being cut off, the cut off area may be subject to back machining operations, such as chamfering. The pick-off and back machining operations are controlled by mechanical cams and actuating devices in the machine. A pick-off attachment can include a dead length collet type attached to a pick-off spindle. The collet may be operated by twin toggles controlled by a special cam mounted on the main camshaft in front of the main drive housing. The pick-off spindle collet is able to grip and release a work piece.

The operation of a pick-off spindle collet is known in the art. A pick-off collet can be axially driven by cams and levers to position the collet over the work piece held by the work spindle. The pick-off collet can grippingly engage the work piece which is then cut from the remaining stock. The piece may be rotated in the pick-off spindle and have a back machining operation performed thereon. An ejector plunger may be used for removal of the work piece from the pick-off spindle. The pick-off spindle can be axially retracted toward the stationary ejector plunger so that the work piece is pushed out of the pick-off collet by the ejector plunger.

DISCLOSURE OF INVENTION

The prior art multi-spindle machines have less than desirable capabilities for controlling work piece pick-off and back machining operations. Many disadvantages of prior art pick-off attachments remain, such as inability to pick-off longer parts, lack of strength for radial and axial loads from work tools, lengthy installation time, inaccurate installations, inability to make adjustments in advantageous locations, lack of commonality of parts between machine brands, premature failure, and low rpms. A further disadvantage is that the rotational speed and the axial movement of the pick-off spindle can be limited. Thus, the types and character of back machining operations which can be performed are limited. Another disadvantage is that the pick-off position is not always consistent and reliable. This can lead to inconsistent back machining operations and wider dimensional variations on work pieces.

There exists a need for a multi-spindle machine having a pick-off attachment arrangement that can overcome disadvantages associated with the prior art pick-off attachments. Thus, there exists a need for a multi-spindle machine having a pick-off arrangement that can improve pick-off and back machining operations. Preferably, such an arrangement would be suited for retrofit on Wickman, National Acme, and New Britain multi-spindle machines.

It is an object of an exemplary form of the present invention to provide a pick-off attachment enabling improved pick-off and back machining operations.

It is a further object of an exemplary form of the present invention to provide a multi-spindle machine system with a pick-off attachment enabling improved pick-off and back machining operations.

It is a further object of an exemplary form of the present invention to provide a pick-off attachment enabling a more compact pick-off spindle.

It is a further object of an exemplary form of the present invention to provide a pick-off attachment enabling a stronger pick-off spindle.

It is a further object of an exemplary form of the present invention to provide a pick-off attachment enabling the pick off of long work pieces.

It is a further object of an exemplary form of the present invention to provide a multi-piece pick-off attachment that provides ease of handling.

It is a further object of an exemplary form of the present invention to provide a multi-piece pick-off attachment that provides quicker installation in a multi-spindle machine.

It is a further object of an exemplary form of the present invention to provide a pick-off attachment that enables high rpms.

It is a further object of an exemplary form of the present invention to provide a pick-off attachment that allows oil lubrication.

It is a further object of an exemplary form of the present invention to provide a pick-off attachment that provides high speed bearings.

It is a further object of an exemplary form of the present invention to provide a pick-off attachment arrangement that permits more accurate installation.

It is a further object of an exemplary form of the present invention to provide a pick-off attachment arrangement with a dovetail support.

It is a further object of an exemplary form of the present invention to provide a pick-off attachment arrangement with slide-inducing material.

It is a further object of an exemplary form of the present invention to provide a pick-off attachment with an overtension stop indicator.

It is a further object of an exemplary form of the present invention to provide a pick-off attachment with an improved linear motion allowance.

It is a further object of an exemplary form of the present invention to provide a pick-off attachment with an increased pick off position to cam position ratio.

It is a further object of an exemplary form of the present invention to provide a pick-off attachment with long-lasting markings.

It is a further object of an exemplary form of the present invention to provide pick-off attachments that permit commonality of parts.

It is a further object of an exemplary form of the present invention to provide a pick-off attachment with a locknut to preload and position bearings.

It is a further object of an exemplary form of the present invention to provide a multi-spindle machine capable of being retrofit to enhance the pick-off and back machining operations.

Further objects of the present invention will be made apparent following the Best Mode for Carrying Out Invention and the appended claims.

The foregoing objects are accomplished in an exemplary form of the invention by a pick-off attachment for a multi-spindle machine that performs pick-off and back machining operations.

BRIEF DESCRIPTION OF DRAWINGS

FIG. 11 shows a pick-off stop arrangement.
FIG. 12 shows a spring indicator arrangement.
FIG. 13 shows a crushable indicator arrangement.
FIG. 14 shows an indicator signal system.

BEST MODE FOR CARRYING OUT INVENTION

Figures 1, 2:
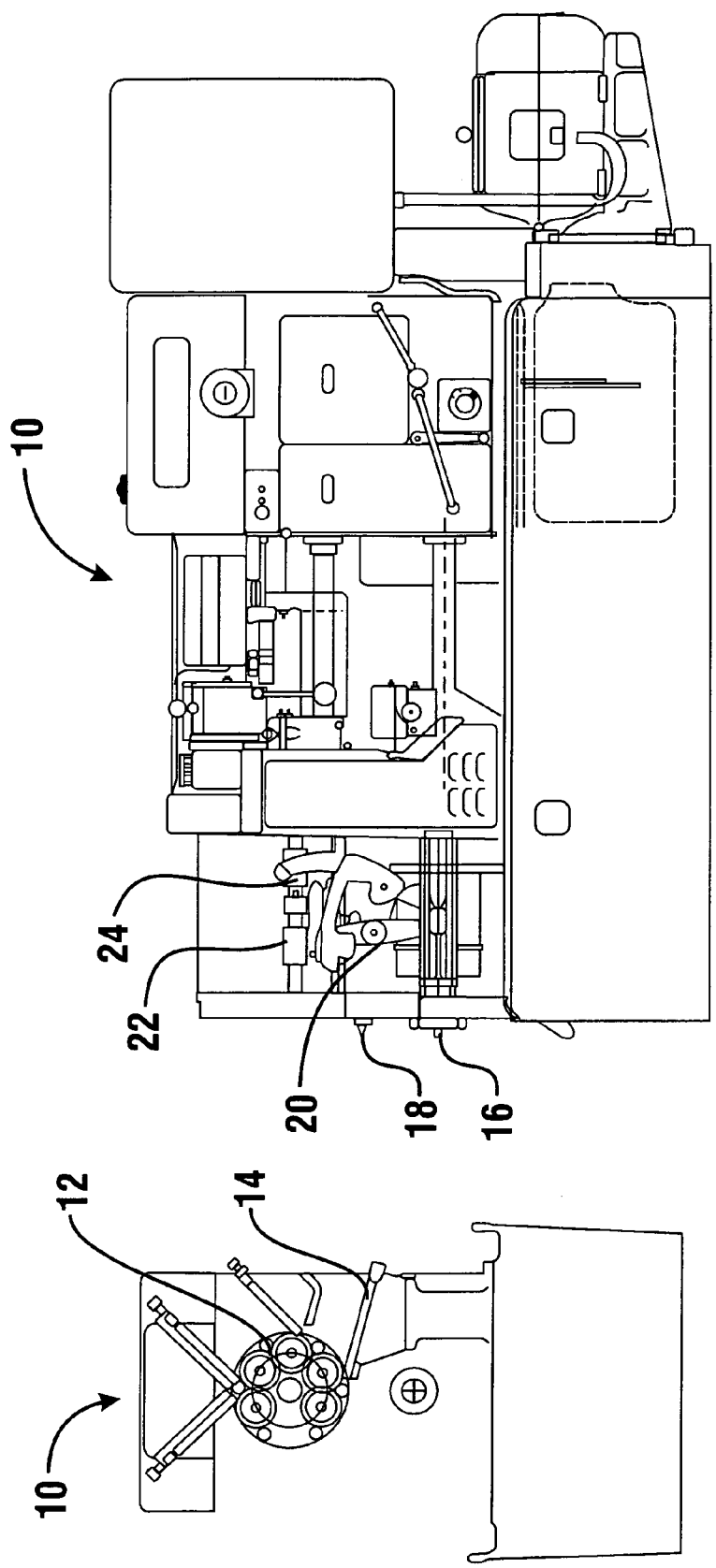
FIG. 1 shows a prior art multi-spindle machine.
FIG. 2 shows a side view of the prior art multi-spindle machine of FIG. 1.

FIG. 1 shows an exemplary prior art multi-spindle machine 10. FIG. 2 shows a side view of the multi-spindle machine 10 of FIG. 1. It should be understood that exemplary embodiments are useable with multi-spindle (or multiple spindle) machines in which it is desired to perform a pick-off operation and/or one or more back machining operations.

The machine components of prior art multi-spindle machines and their operations are well known. The multi-spindle machine 10 in FIG. 1 shows a work spindle 12 and a slide 14. The multi-spindle machine 10 in FIG. 2 shows a cam shaft 16, roller pin 18, collet operating lever 20, bar feed slide 22, and a collet operating slide 24.

Figure 3:
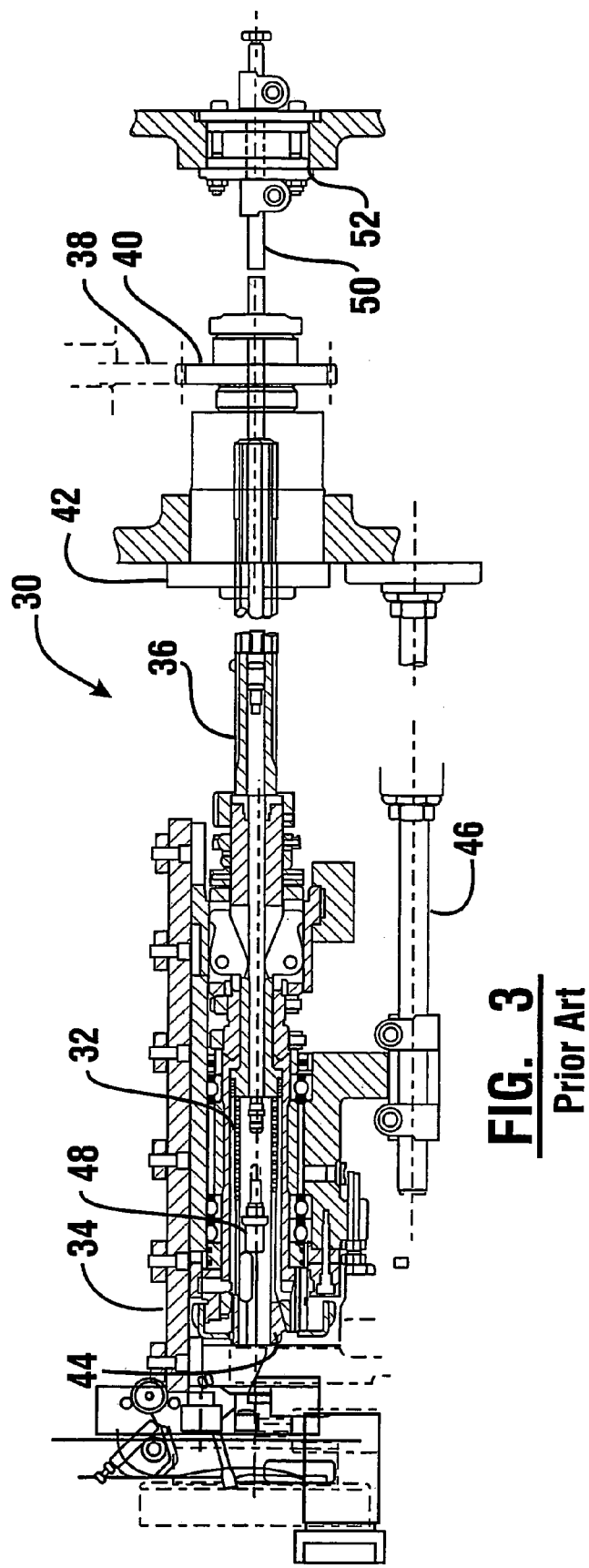
FIG. 3 shows a prior art pick-off attachment for a multi-spindle machine.

FIG. 3 shows a prior art pick-off attachment 30 for the multi-spindle machine 10. The pick-off attachment may be used for pick-off and back machining operations. The pick-off attachment includes a pick-off spindle 32. The pick-off spindle is mechanically driven through the gear train of the machine both rotationally and axially. The pick-off spindle is movable in supported connection with a subslide 34. The pick-off spindle is attached to a splined drive shaft 36 which is driven by a mechanical driving gear 38. Gear 38 rotates an attachment gear 40. The driving gear 38 is able to rotate the pick-off spindle 32 through rotation of gear 40. Drive shaft 36 is supported on the machine through a bearing housing 42. A pick-off collet 44 is attached to the pick-off spindle. The pick-off collet 44 is moved during each machine cycle adjacent to a work spindle collet (shown in outline) and to a back machining tool (shown in outline). The pick-off collet is able to grip and eject a work piece component. The movement of the pick-off attachment is set according to cams which rotate during the machine cycle and which control the timing of the various components of the multi-spindle machine.

A pusher rod 46 moves the pick-off spindle in a direction parallel to the axis of the pick-off spindle 32. The pusher rod is mechanically driven axially responsive to the gear train of the machine through a mechanism including cams and levers. An ejector 48 is attached to an ejector rod 50. The ejector rod 50 is attached to a base 52. As the pick-off spindle is axially moved toward the base 52, then the ejector 48 operates to cause the work piece to be pushed out of the collet 44.

The pick-off spindle can have a rotational speed which is generally mechanically gear driven. The rotational speed is set one to one with the spindle speed. During a pick-off operation, the pick-off spindle with the collet is moved axially up to the workpiece and is rotated at the same speed as the workpiece. The collet is moved over the work piece to grasp and hold it so that the work piece may be cut off.

Later the work piece may be removed or dropped from the collet. Additional description relating to multi-spindle machines and pick-off attachments, and operation thereof, may be found in U.S. Pat. No. 6,510,769, the disclosure of which is fully incorporated herein by reference.

Figure 4:
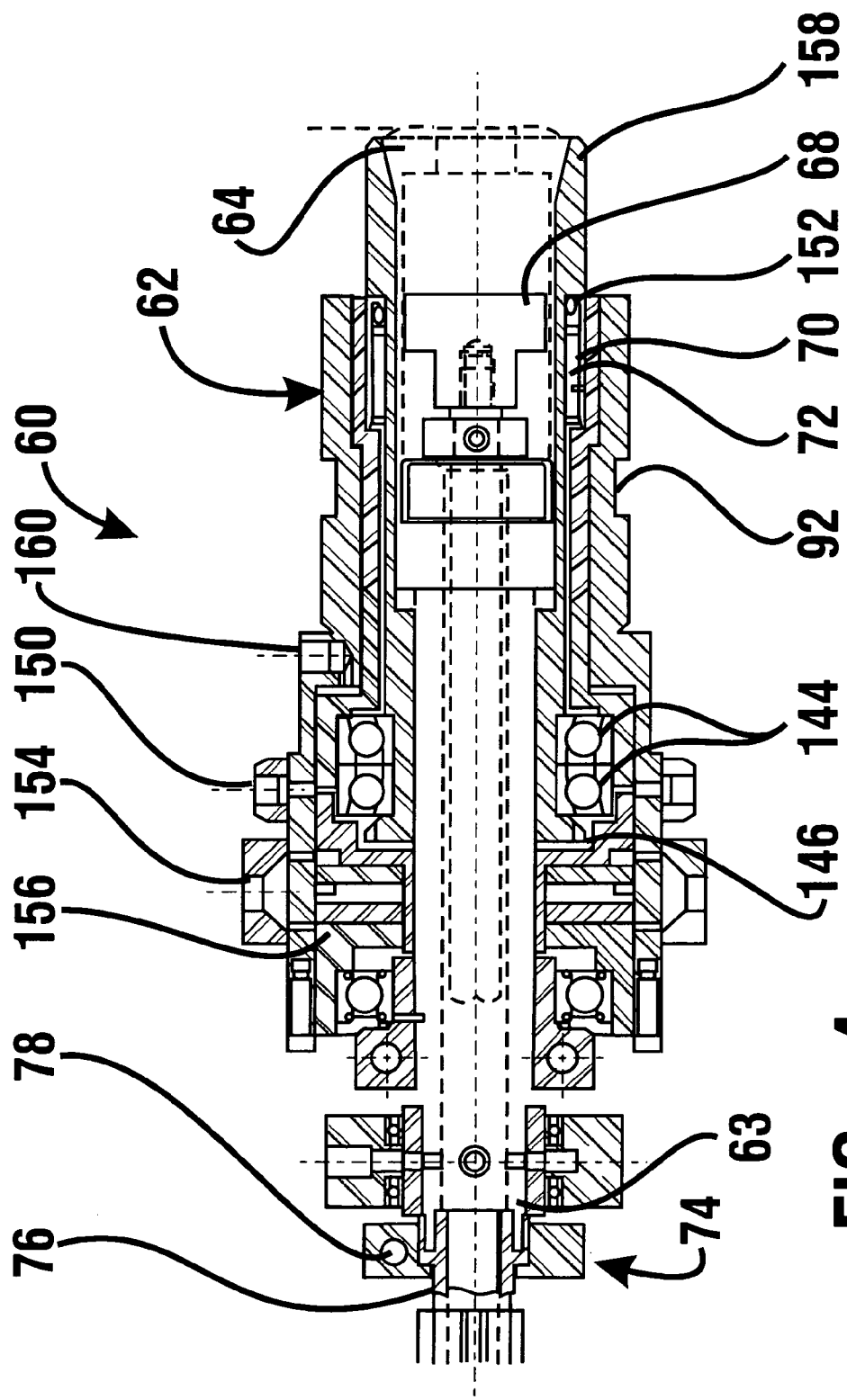
FIG. 4 shows a pick-off spindle for a multi-spindle machine.
Figure 5:
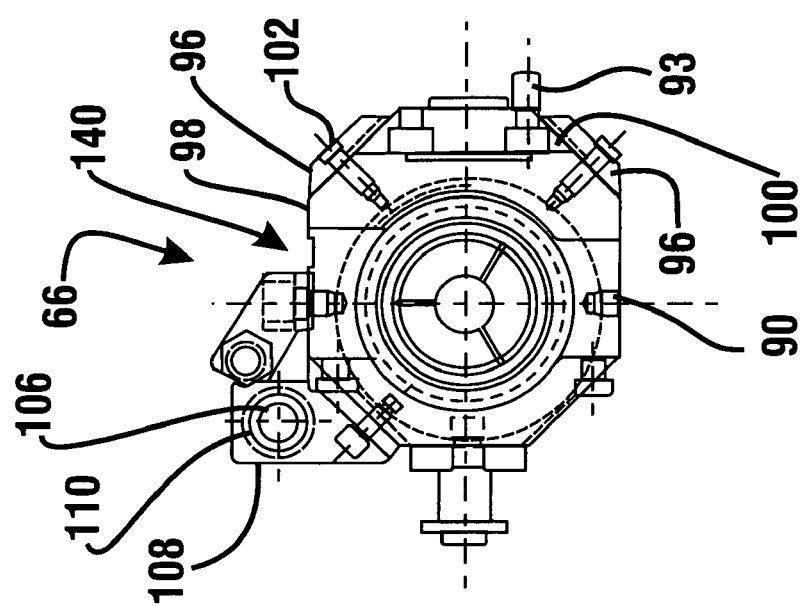
FIG. 5 shows a pick-off spindle housing.
Figure 6:
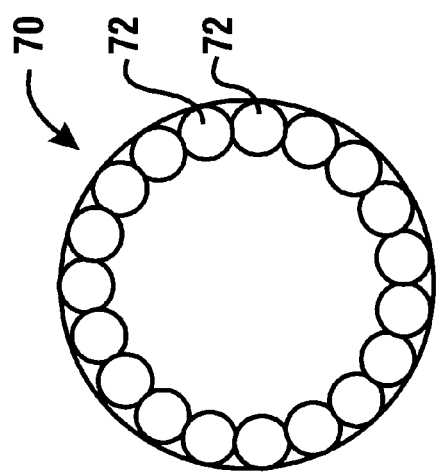
FIG. 6 shows a needle roller bearing for a pick-off spindle.

An exemplary embodiment is shown in FIGS. 4 and 5. FIG. 4 shows a segment of a pick-off attachment (which may also be referred to herein as a pick-off or pick-up assembly or arrangement) for a multi-spindle machine. The segment of the pick-off attachment 60 includes a pick-off spindle 62. A pick-off collet 64 is attached to the pick-off spindle. FIG. 5 shows a pick-off spindle housing 66. A push rod or plunger assembly 68 is also shown. In the exemplary form, the pick-off spindle includes high speed needle roller bearings 70. The needle roller bearings can include a plurality of pins or rods 72, as shown in FIG. 6. Adjacent bearing rods 72 can be placed in an annular formation about a circumference. The use of needle roller bearings in a pick-off attachment provides greater rigidity, resulting in the ability to handle stronger radial (10× radial capacity) and axial loads from tools. Due to the increased strength of the pick-off spindle, it can function more like a work spindle.

In a further exemplary embodiment the pick-off attachment 60 can be of multi-piece construction. For example, the pick-off attachment may be of two-piece construction. The multi-piece construction enables faster installation and removal of the pick-off attachment with a multi-spindle machine. FIG. 4 shows a removable connector or fastener 74 attaching a pick-off spindle body portion 63 to a pick-off drive shaft 76. That is, the fastener 74 connects a first piece 63 and a second piece 76 in assembling the multi-piece pick-off attachment 60.

Figure 7:
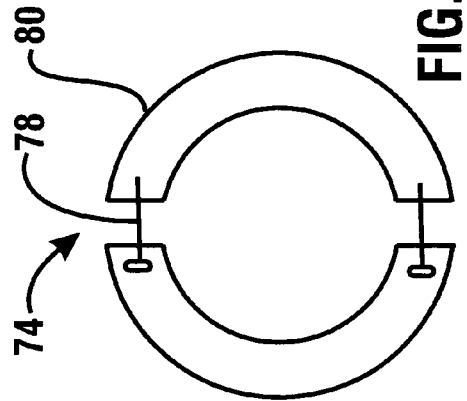
FIG. 7 shows a pick-off attachment clamp.

The fastener may comprise a clamp or split collar 80, as shown in the cross-sectional view of FIG. 7. One or more bolts or screws 78 (or other known tightening components) can be used to tighten the split collar in order to clamp together the shaft 76 and spindle body portion 63. The fastener 74 is operative to exert sufficient radial pressure to maintain the shaft and body in connected relationship. Of course it should be understood that other types of removable fasteners may also be used to connect the shaft and spindle body.

Figure 9:
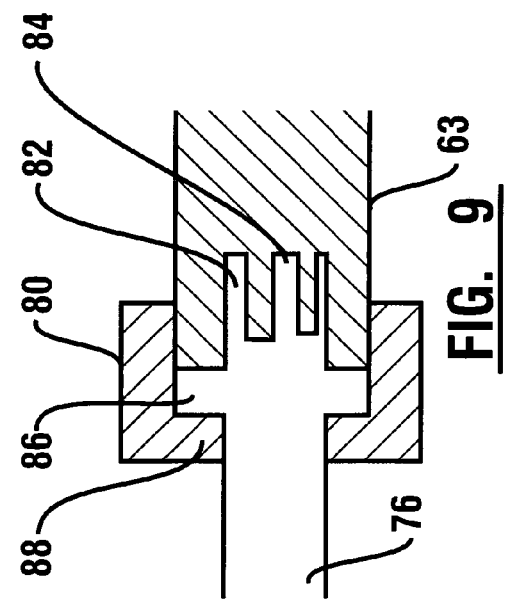
FIG. 9 shows a shaft clamped to a spindle body portion.
Figure 8:
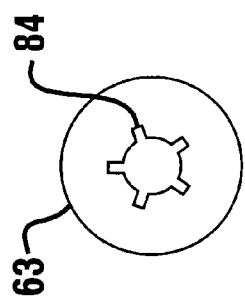
FIG. 8 shows a cross-sectional view of a spindle body portion.

Additionally, the drive shaft 76 may have splines 82 which are operative to be inserted into corresponding spline receiving openings (or grooves or slots) in the spindle body portion 63. FIG. 8 shows a cross-sectional view of a spindle body portion 63 having spline receiving openings 84. FIG. 9 shows the collar 80 clamping the shaft 76 to the spindle body portion 63.

The drive shaft 76 can include a flange 86 adjacent an end thereof, as shown in FIG. 4 and FIG. 9. The shaft flange 86 is operative to contact or abut an end of the spindle body portion 63. The flange can extend (or protrude) in a radial and annular direction relative to an axis of the shaft 76. The flange can be used to accurately position and align the shaft relative to the spindle body portion, such as in engaging or abutting relationship. Thus, an assembled pick-off attachment can have a drive shaft and spindle body with a common axis. That is, the shaft axis and the spindle body axis can be parallel and aligned after being assembled in clamped relationship.

The collar 80 can have a lip 88 (or flange or projection). The lip can extend (or protrude) in a radial and annular direction relative to an axis of the spindle body. The lip 88 is operative to maintain or trap the drive shaft flange 86 adjacent to the end of the spindle body portion. Thus, the collar lip 88 and shaft flange 86 relationship can assist in attaching a drive shaft to a spindle body.

The pick-off attachment also includes a spindle housing or pick-off housing 66. FIG. 5 shows a cross-sectional view of the pick-off housing 66. The housing can be removably attached to the pick-off spindle body 62 of FIG. 4. One or more fasteners 90 can be used to connect the housing 66 and spindle body 62. The fasteners may be circumferentially spaced. The spindle body 62 can include a fastener receiving portion such as an annular groove or slot 92 at an outer diameter of the body. The groove 92 can assist in aligning and positioning the spindle housing relative to the spindle body.

The pick-off attachment housing 66 can be mounted to and/or supported by a fixed supporting base of a multi-spindle machine. The pick-off attachment housing 66 is operative to slide relative to the base. Thus, the pick-off attachment 60 is operative to move in an axial direction relative to the base. The base can have a male dovetail portion or slide 100, such as on a side thereof. The dovetail 100 may be mounted to the base with fasteners 93. Alternatively, a dovetail may be integral or one-piece with a base. The housing can have a female dovetail arrangement matching or corresponding to the male dovetail portion. The housing dovetail arrangement can comprise plural arms 96 removably fastened to the housing body 98. The arm fastening can include one or more screws or bolts 102 (or other known fastener components).

Figure 10:
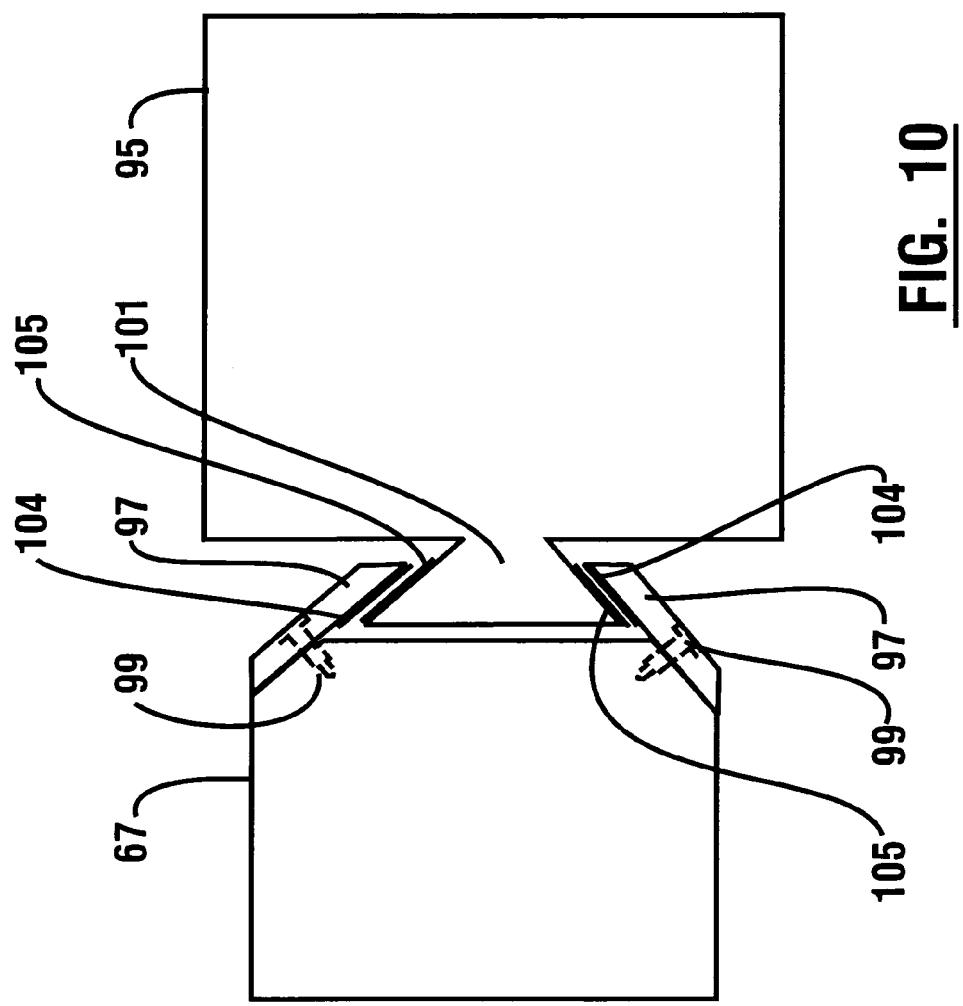
FIG. 10 shows a cross-sectional view of a pick-off attachment housing mounted to a dovetail slide.

FIG. 10 shows a cross-sectional view of a pick-off attachment housing 67 mounted to a dovetail slide 101 and slidable relative thereto. The housing arms 97 are operative to be arranged in sliding engagement with the dovetail slide of the base 95. The base can support a pick-off attachment via the housing arms. The arms 97 can be removably attached to the housing 67 with one or more fasteners 99. As shown in FIG. 10, the arms can be mounted on a side of the housing. The dovetail slide can be at a side of the base 95.

The angled relationship of the arms and the dovetail can trap the housing onto the slide. That is, the arms can engage the slide to lock the housing thereto. The dovetail slide can support the housing via the arms, yet allow axial sliding of the housing thereon. The housing may be removed from the dovetail by being slid off an end of the dovetail. Alternatively, the housing may be removed from the dovetail by removing at least one arm. The housing may be placed on the dovetail in a procedure opposite from removal. It should be understood that the spacing shown between the arms and the dovetail in FIG. 10 is for illustrative purposes, and that an engagement between the arms and the dovetail may be closer fit so that one or both of the arms can contact and slide on the dovetail.

In a further exemplary form of sliding relationship, a material may be applied (e.g., coated, plated, dipped, or integrally embedded) or attached (e.g., fastened) to the arms and/or the base dovetail slide. The material may comprise a hard slippery coating or composite which promotes slidability and/or reduces wear between the arms and the slide. For example, the material may comprise a polymer or plastic. A Turcite composite may be used. The Turcite material can be applied or attached to the arms and/or the slide. Different grades and forms of Turcite material may be used. For example, the Turcite material may be in the form of a removably attachable pad. A slip encouraging material, such as Turcite, can be on both the arms and the dovetail slide. FIG. 10 further shows a material 104 on both arms 97 and a material 105 on the dovetail slide 100. The material on the dovetail may also differ from the material (if any) on the arms. Likewise, a material on one arm may differ from a material on another arm.

In a further exemplary embodiment a stop rod arrangement simplifies the adjusting of pick-up stops. The exemplary arrangement enables a machine operator to adjust a pick-up stop in the tool zone. The pick-off attachment housing 66 can be engaged with a positive stop rod 106. The housing 66 can have an ear flange 108 with an opening 110 through which the stop rod 106 can protrude, as shown in FIG. 5. The ear flange is able to slide along or on the stop rod. Movement of the ear flange along the rod in a direction toward the work piece can be limited by a positive stop. The stop may be attached to the rod 106, such as to the outer diameter or circumference of the rod. The position of the stop on the rod can be adjustable.

FIG. 11 shows a stop comprising a pair of adjacent nuts 112, 112 on a stop rod 107. The stop rod extends through a housing ear flange 109. The nuts can be threaded onto threads in the stop rod 107. The nuts may be loosened, moved to at different location along the axis of the rod, and then tightened together. The engaged duality of the nuts enables the nuts to be locked at a predetermined specific position on the stop rod. The stop rod may also have markings or indicia (e.g., measurement lines) thereon to assist in accurate positioning of the stop. Of course other known adjustable stop members may be used instead of dual nuts. For example, a clamp or collar or pin (insertable through a radial hole in the rod) may be used as a stop. Also, it should be understood that a stop rod is not limited to having a cylindrical cross-sectional shape but may have other cross-sectional shapes, including that of a square rod.

During a machine setup operation, a setup person can position the pick-off housing ear (or the pick-off collet) at the desired axial pick-off location relative to a work piece on a machine spindle. The stop can then be set or fixed to limit the movement of the pick-off attachment to that predetermined specific axial position of the stop. That is, the stop can be accurately arranged on the stop rod so as to stop the axial movement of the pick-off collet during machine operation at the desired pick-off position. Since the stop adjustment can be made in the tool zone area, in view of the desired pick-off position of the collet, a more precise stop setting may be achieved.

The stop/stop rod arrangement may also include an over-tension indicator or sensor associated therewith. The indicator can be a collapsible member, such as a Belleville spring or foil, that compresses or crushes if the pick-off position of the housing is set to tight. For example, if the stop were set too far upstream then the housing ear may apply an excessive amount of pressure against the stop (and excessive tension on the stop rod). The indicator allows a setup person to more easily determine if the recommended stop pressure has been exceeded.

FIG. 12 shows a compressible spring indicator 114 placed adjacent a stop 116 locked in position on a stop rod 118. FIG. 13 shows a crushable foil indicator 120 placed adjacent to a stop 122 locked in position on a stop rod 124. The indicator will begin to deform at a predetermined pressure level. If the pressure exceeds a predetermined pressure level of the indicator then the ear will deform the indicator by pressing the indicator against the stop. Other types of indicators may also be used, such as a strain gauge 126 associated with the stop rod 107 in FIG. 11. A deformed spring or foil may be a visible indicator to the setup person. Alternatively, an indicator 114, 120, 126 may also be connected to an electrical circuit. FIG. 13 shows the indicator 120 associated with an electrical signal connection 128. The signal connection 128 can be linked to a system having a visible and/or audible components operative to produce a signal detectable by the setup person. FIG. 14 shows an indicator system 130 associated with the electrical signal connection 128, and having both a visible component 132 and an audible component 134. A connection between an indicator and an indicator system may also be wireless. An indicator system may also be portable and/or a hand-held device. A computer or controller 133 can be operatively connected to the indicator system 130 and the over-tension sensors to control the system and signal an over pressure situation. The indicator system may also be situated with the main control board of a multiple spindle machine.

The visible indicator component may comprise a display screen operative to display an over pressure warning message, or flash lights (e.g., LED) upon an over pressure detection, or a change a light color status such as from green to red, etc. The audible indicator component may comprise a tone generator, an alarm, or other sound(s) indicative of an over pressure setting. Thus, an operator can be notified of an indicator sensing (or tripping due to) an exceeding setup pressure. The operator can then adjust the setting to be in compliance.

In a further exemplary embodiment the pick-off attachment housing 66 has a slotted (or cutout or recessed) area 140 specifically designated for machine markings. The designated housing marking area may comprise a soft pocket. A machine serial number can be permanently stamped or etched into the designated area 140. The housing area can be designated for machine identification purposes. The designated marking area can be situated at an easily accessible and readable location on the housing. A machine serial number included in the designated area can result in a reduction in time associating parts with the correct machine. Furthermore, the (attempted) mounting of the wrong pick-off attachment into a machine can be eliminated.

The pick-off spindle body 62 can also include high precision, high speed, angular contact ball bearings 144. A bearing locknut 146 can be used to preload and position the bearings 144. The arrangement eliminates the need of a retaining ring. The locknut arrangement further reduces maintenance and machine downtime.

The spindle body 62 is also arranged to permit use of an oil lubrication system. The usage of oil lubrication with high speed bearings allows for higher rpms. The use of higher rpms permits additional (or ease of) functions to be performed with the pick-off attachment, such as back machining, drilling, tapping, finishing, reaming, chamfering, recessing, and/or deburring. For example, an exemplary form of pick-off attachment can achieve up to 9500 rpms with a 1¼RA-6 multi-spindle screw machine.

The oil can flow through an opening 150 in the spindle body 62. The oil can through passages in the spindle to lubricate the bearings 70, 144. A C-shaped annular seal 152 can be arranged adjacent the collet end of the spindle body 62 (e.g., adjacent to the needle roller bearings 70 to assist in keeping the lubricant in the spindle body. With a rise in lubricant pressure, the oil pressure would act against the C-shaped seal 152 to press the seal in further contact with the spindle body and collet surface. That is, increasing pressure would act to open the C-shaped seal which would result in further sealing. Thus, the sealing ability can be proportional to the pressure on the seal 152.

Fluid pressure (e.g., air and/or liquid) can be introduced into the spindle body opening 154 to radially move the pick-off collet 64 to a locking or grasping position. For example, as driving pressure: axially moves a collet actuator or cam 158 to the right in FIG. 4, the collet fingers radially move inward toward a grasping position. Thus, the collet can be actuated to grip a work piece. As seen in FIG. 4, the fluid pressure applied in a gap area 156 can act to initially move the actuator a certain distance. However, once the actuator slightly moves (away from the gap), then a larger wall surface area adjacent to the gap becomes exposed to the fluid pressure. The pressure can then act against this larger surface area to apply additional grasping force. Pressure can also be another spindle body opening 160 to move the collet actuator in a reverse or backwards direction so that the collet fingers are fully opened. As pressure is applied through opening 160 pressure is released from opening 154, and vice versa through appropriate conduits and valves. Thus, the collet can be operated to both grasp and bring about the release of a work piece.

In a further exemplary form of the present invention the pick-off attachment can have a pick-off position to cam position ratio of approximately 2.5:1. That is, a one inch axial movement of a spindle drive cam can result in a 2.5 inch axial movement of a pick-off attachment housing along a stop rod. This feature of increased linear motion allowance can be retrofit into existing machines. No change or modification to existing cams need be necessary. The feature will allow for additional stroke of the pick-off attachment, which may be necessary when working with longer parts.

Figure 15:
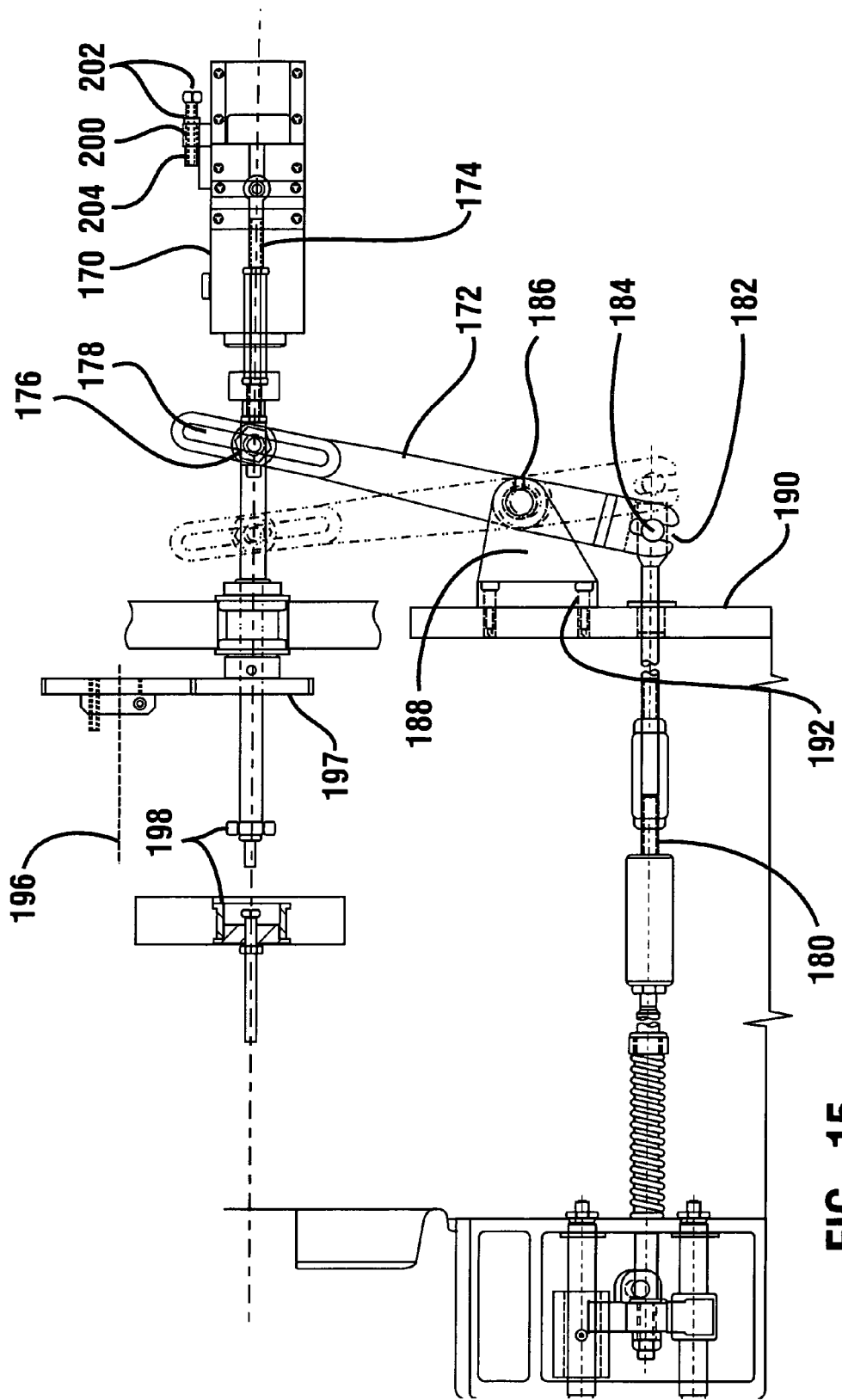
FIG. 15 shows a pick-off attachment housing drive arrangement.

FIG. 15 shows a pick-off attachment housing 170 connected to an operating lever 172 via an intermediate rod 174. The rod can be attached to the lever with a fastener 176. The lever can include a slot 178 in which the fastener can be removably fixed. The fastener has a suitable washer and sleeve or other arrangement to enable the pivot to be fixed relative to the slot while still enabling relative rotational movement of lever 172 to rod 174. FIG. 15 shows the fastener 176 fixedly located at a middle or center portion of the slot 178. However, the fastener can be moved to any position along the slot and then locked in the selected position by tightening. To achieve a 2.5 inch linear movement for the pick-off attachment housing 170, the fastener can be fixed at the end position of the slot (i.e., the position nearest to the end portion of the lever).

The opposite end of the lever 172 is attached to a movable shaft 180. For example, the lever may have an end slot 182 which can ride on a pin 184 projecting from of an end portion of the shaft 180. The lever may rest and be supported on the shaft pin (via the end slot 182) while being free to rotate (or pivot) thereabout. Alternatively, other arrangements may have a shaft pin and a lever fixedly secured to each other.

The lever 172 is able to pivot about a pivot axis 186 intermediate the ends of the lever. The pivot axis can include a flange support 188 attached to a wall 190 (e.g., the face of a gearbox) by fasteners 192. The lever 172 can be engaged with the flange support 188 via a rod or pin 186 extending through respective aligned openings in the lever and support. The lever can be moved between the outline position and the solid line position of FIG. 15. The flange support 188 may be repositioned at a different elevation on the wall 190 to produce different lever pivoting arrangements.

FIG. 15 also shows a spindle drive shaft axis 196, an ejector assembly 198 for a push rod, a housing ear 200, a drive assembly 197, and stop nuts 202 on a stop rod 204. During machine cycling operation the movable drive shaft 180 is driven (away from the lever) to pivot the lever 172 to axially move (drive) the pick-off housing 170 along the stop rod 204 toward a work piece. As previously discussed, this movement can be used to prepare a collet to grip a work piece. The pick-off spindle can be axially retracted toward a stationary ejector plunger so that the work piece is pushed out of the pick-off collet by the ejector plunger.

In an exemplary embodiment the pick-off attachment can be shorter in the axial length than prior art attachments due to the features discussed herein, such as the strength imparted by the needle roller bearings. A shorter or more compact pick-off attachment enables a machine to pick off longer parts, and thus eliminate a secondary operation. Furthermore, more standard length tools can be used for back finishing, thus resulting in lower tooling costs. The previous need of special tools that had to be shortened in order to permit longer parts into the machine cycle can be reduced or eliminated. An exemplary form of the pick-off attachment can be more than 2 inches shorter (e.g., 2.5 inches shorter) in axial length than prior art pick-off attachments.

Furthermore, the features discussed herein allow for common parts to be used between pick-off attachments and different brands of machines. For example, there can be some commonality of pick-off attachment parts between New Britain and National Acme brand machines. That is, some parts of the pick-off attachment described herein (e.g., bearings, removable arms, ears, two-piece collar, etc.) may also be used in a pick-off attachment for a different machine design.

The method of using the novel pick-off attachment of the exemplary embodiment enables grasping, holding, and releasing a work piece during respective pick-off, back machining, and dropping operations. The exemplary embodiments also facilitate conducting a plurality of back machining operations on a work piece in the multi-spindle machine.

An exemplary operation of a multi-spindle machine performing pick-off and back machining operations may include the following steps: matching the rotational speed of the pick-off collet with the speed of the work spindle collet; extending the pick-off collet over the work piece; grasping the work piece with the pick-off collet; cutting the work piece from the remaining stock with a transversely extending tool; adjusting the rotational speed of the work piece through rotation of the pick-off spindle; axially moving the work piece to conduct a back machining position; back machining the work piece with an appropriate tool; axially moving the work piece to an eject position; and ejecting the work piece into a work piece catcher.

The novel pick-off attachment of the exemplary embodiment can also be used with current multi-spindle machines. It should be apparent that the embodiment shown is equally applicable to any multi-spindle machine capable of employing operations such as work piece pick-off, back machining, and dropping. Therefore, existing multi-spindle machines may be retrofit with the novel pick-off attachment. For example, features of the novel pick-off attachment and system as described herein may be applicable to each of a Wickman, National Acme, and New Britain brand multi-spindle machines.

Thus, a multi-spindle machine employing the novel pick-off attachment of the present invention achieves the above stated objectives of exemplary forms, eliminates difficulties encountered in the use of prior devices and systems, solves problems, and attains the desired results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated, and the advantages and useful results attained; the new and useful structures, devices, elements, arrangements, parts, combinations, systems, equipment, operations and relationships are set forth in the appended claims.

We claim:

1. An apparatus comprising:
   a multiple spindle machine pick-off attachment housing,
   a drive shaft,
     wherein the drive shaft comprises an axis,
       wherein the drive shaft is movable in an axial direction,
   at least one connecting member,
     wherein the drive shaft is connected to the housing via the at least one connecting member,
     wherein the drive shaft is operative to drive the housing,
       wherein movement of the drive shaft in the axial direction a first distance is operative to cause movement of the housing a second distance,
         wherein the second distance is greater than the first distance.

2. The apparatus according to claim 1 wherein the housing is movable in a direction substantially parallel to the axial direction, wherein movement of the drive shaft in the axial direction is operative to cause movement of the housing in the direction substantially parallel to the axial direction.

3. The apparatus according to claim 1 wherein the at least one connecting member includes a pivotable lever.

4. The apparatus according to claim 3 wherein the drive shaft is connected to the housing via the lever.

5. The apparatus according to claim 3 wherein the at least one connecting member includes an intermediate rod, wherein the housing is connected to the lever via the intermediate rod.

6. The apparatus according to claim 5 wherein the lever is pivotally connected to the intermediate rod.

7. The apparatus according to claim 6 wherein an end of the lever is pivotally connected to the intermediate rod.

8. The apparatus according to claim 7
   wherein the end includes a slot,
   wherein the lever is removably fastenable to the intermediate rod via a fastener,
     wherein the fastener is adjustably positionable along the slot,
       wherein the fastener in a non-fastening state is movable in the slot,
       wherein the fastener in a fastening state is fixed relative to the slot.

9. The apparatus according to claim 3 wherein the lever is pivotally connected to the drive shaft.

10. The apparatus according to claim 9 wherein an end of the lever is pivotally connected to the drive shaft.

11. The apparatus according to claim 3 wherein the lever includes ends, wherein the lever is pivotable about an pivot axis intermediate the ends, wherein movement of the drive shaft is operative to cause the lever to pivot about the pivot axis.

12. The apparatus according to claim 11 wherein the lever includes an opening intermediate the ends, wherein a support includes the pivot axis, wherein the lever is pivotally engaged with the support via an engagement member extending through the opening.

13. The apparatus according to claim 1 and further comprising a multiple spindle machine,
   wherein the multiple spindle machine includes the pick-off attachment housing, the at least one connecting member, and the drive shaft,
   wherein the multiple spindle machine further includes a pick-off attachment,
     wherein the pick-off attachment housing houses at least a portion of the pick-off attachment,
     wherein the pick-off attachment includes a pick-off spindle,
       wherein the pick-off spindle includes a spindle axis,
         wherein the pick-off spindle is adapted to be rotationally driven about the spindle axis,
       wherein the pick-off spindle is operatively connected to a pick-off collet,
         wherein the pick-off collet is operative to grasp a work piece.

14. The apparatus according to claim 2 wherein the ratio of the second distance to the first distance is greater than 2 to 1.

15. The apparatus according to claim 14 wherein the ratio of the second distance to the first distance is approximately 2.5 to 1.0, wherein a 1.0 inch axial movement of the drive shaft causes a 2.5 inch axial movement of the housing.

16. The apparatus according to claim 13 wherein the at least one connecting member includes a pivotable lever and an intermediate rod, wherein the housing is connected to the intermediate rod, wherein a first end of the lever is pivotally connected to the intermediate rod, wherein a second end of the lever is pivotally connected to the drive shaft, wherein the lever is pivotable about an pivot axis intermediate the first and second ends, wherein movement of the drive shaft in the axial direction is operative to cause movement of the housing in a direction substantially parallel to the axial direction.

17. The apparatus according to claim 1
   wherein the at least one connecting member includes an intermediate rod and a pivotable lever, wherein the drive shaft is pivotally connected to the lever at a first connection, wherein the lever is pivotally connected to the intermediate rod at a second connection, wherein the intermediate rod is connected to the housing,
   wherein the lever includes ends, wherein the lever is pivotable about a pivot axis intermediate the ends, wherein the pivot axis is closer to the first connection than the second connection, and wherein movement of the drive shaft the first distance is operative to cause the lever to pivot about the pivot axis to cause movement of the housing the second distance.

18. Apparatus comprising:
   a multiple spindle machine pick-off attachment housing,
   a shaft,
     wherein the shaft comprises an axis,
       wherein the shaft is movable in an axial direction,
   at least one connecting member,
     wherein the at least one connecting member includes a pivotable lever,
       wherein an end of the lever includes a slot,
         wherein the lever is pivotally connected to the shaft at the slot, wherein the shaft is connected to the housing via the at least one connecting member,
wherein the shaft is operative to move the housing,
wherein movement of the shaft in the axial direction a first distance is operative to cause movement of the housing a second distance,
wherein the second distance is greater than the first distance.

19. A multiple spindle machine including:
a pick-off attachment housing,
wherein the pick-off attachment housing houses at least a portion of a pick-off attachment,
wherein the pick-off attachment includes a pick-off spindle,
wherein the pick-off spindle is operatively connected to a pick-off collet,
wherein the pick-off collet is operative to grasp a work piece,
a drive shaft,
wherein the drive shaft comprises an axis,
wherein the drive shaft is movable in an axial direction,
at least one connecting member,
wherein the at least one connecting member includes a pivotable lever,
wherein the lever is operative to pivot about axes located at a first end portion, a second end portion, and an intermediate portion,
wherein the drive shaft is connected to the housing via the lever,
wherein the lever is pivotally connected to the drive shaft,
wherein the drive shaft is operative to drive the housing,
wherein movement of the drive shaft in the axial direction is operative to cause movement of the housing in a direction substantially parallel to the axial direction,
wherein movement of the drive shaft in the axial direction a first distance is operative to cause movement of the housing a second distance,
wherein the second distance is greater than the first distance.

20. Apparatus comprising:
a multiple spindle machine pick-off attachment housing,
at least one connecting member,
wherein the at least one connecting member includes a pivotable lever,
wherein the lever includes ends,
wherein the lever is pivotable about an pivot axis intermediate the ends,
wherein a support includes the pivot axis,
wherein the lever includes an opening intermediate the ends,
wherein the lever is pivotally engaged with the support via an engagement member extending through the opening,
a shaft,
wherein the shaft is connected to the housing via the at least one connecting member,
wherein the shaft comprises an axis,
wherein the shaft is movable in an axial direction,
wherein movement of the shaft is operative to cause the lever to pivot about the pivot axis,
wherein the shaft is operative to move the housing,
wherein movement of the shaft in the axial direction a first distance is operative to cause movement of the housing a second distance,
wherein the second distance is greater than the first distance.

* * * * *